United States Patent [19]

Volynets et al.

[11] Patent Number: 4,490,286

[45] Date of Patent: Dec. 25, 1984

[54] PHOTOCHROMIC AND/OR CATHODOCHROMIC SODALITE MATERIAL, METHOD OF ITS PREPARATION, AND SENSING ELEMENT OF A VARIABLE LIGHT TRANSMISSION DEVICE MANUFACTURED FROM SUCH MATERIAL

[75] Inventors: Filipp K. Volynets; Vladimir A. Demidenko, both of Leningrad; Roman A. Denisov; Viktor P. Denx, both of Tartu; Alexandr E. Dydelzak, Tartu; Engels N. Ryzhikov; Evgenia A. Terentieva, both of Leningrad, all of U.S.S.R.

[73] Assignee: Institut Fiziki Akademii Nauk Estonskoi SSR, Tartu, U.S.S.R.

[21] Appl. No.: 333,853

[22] PCT Filed: Mar. 31, 1981

[86] PCT No.: PCT/SU81/00030

§ 371 Date: Dec. 14, 1981

§ 102(e) Date: Dec. 14, 1981

[87] PCT Pub. No.: WO81/03036

PCT Pub. Date: Oct. 29, 1981

[51] Int. Cl.$^3$ ............................................. C30B 29/34
[52] U.S. Cl. .............................. 252/583; 252/301.4 F; 252/584; 252/586
[58] Field of Search ................. 252/301.4 F, 584, 583, 252/586

[56] References Cited

U.S. PATENT DOCUMENTS

| 3,799,881 | 3/1974 | Shidlovsky . | |
|---|---|---|---|
| 3,923,529 | 12/1975 | Araujo et al. | 106/52 |
| 3,959,584 | 5/1976 | Todd, Jr. | 178/7.88 |

FOREIGN PATENT DOCUMENTS

| 1425071 | 2/1976 | United Kingdom . |
| 400137 | 7/1974 | U.S.S.R. . |
| 674116 | 7/1979 | U.S.S.R. . |

OTHER PUBLICATIONS

Pauling, "The structure of Sosalite and Helvite", Zeitschrift für Kristallografie, V. 74, 1930, p. 213.
Faughnan, et al. "Cathodochromic Materials and Applications", Proceedings of the IEEE, V. 61, No. 7, 1973, pp. 927–941.
Todd et al., "High Brightness, High Resolution Projection CCRT", 1977, International Electron Devices Meeting, IEEE, New York, 1977, pp. 80A–80D.
Bhalla, "Electron-beam damage in Cathodochromic Sodalites", J. of Applied Physics, V. 45, No. 9, 1974, pp. 3703–3709.
Volynets, "Present and Future Development of Optoceramics", Optomechanical Industries, No. 11, pp. 39–41, 1978.
Shaldin et al., "Electrical and Optical properties of Sodalite single crystals", Crystallografia, V. 10, Issue 4, 1965, pp. 574–577.
"The Growth and Properties of Sodalite Crystals", Melnikov et al., Science Publishing House, Moscow (1977), p. 8.

Primary Examiner—Deborah L. Kyle
Assistant Examiner—Anne Brookes
Attorney, Agent, or Firm—Fleit, Jacobson, Cohn & Price

[57] ABSTRACT

A photochromic and/or cathodochromic sodalite material according to the invention represents a transparent monolith with a homogeneous polycrystalline structure and has a density in excess of 99% of the theoretical density of sodalite with an identical chemical composition. Such material is prepared by hot moulding of the sodalite powder obtained by any method under conditions preventing intense evaporation of alkali halides and incongruent melting of the sodalite. The sensing element of the prepared material is made in the form of a plate with its thickness chosen according to the desired sensitivity of radiation registration and the desired contrast ratio of the image stored as the sensing element is in transparent mode of operation.

5 Claims, 11 Drawing Figures

PHOTOCHROMIC AND/OR CATHODOCHROMIC SODALITE MATERIAL, METHOD OF ITS PREPARATION, AND SENSING ELEMENT OF A VARIABLE LIGHT TRANSMISSION DEVICE MANUFACTURED FROM SUCH MATERIAL

FIELD OF THE INVENTION

The invention relates to optoelectronics, and more specifically to sodalite group materials exhibiting either photochromic or cathodochromic properties, or both, and employed for manufacture of sensing elements used in video recording or radiation field registration, and photoelectric or visual readout of the information stored, using coherent and incoherent light. The invention also concerns methods of preparation of photochromic and/or cathodochromic sodalite materials. It is another object of the invention to offer sensing elements made of such materials and used in variable light transmission devices including those providing for cathode-ray information storage and display, optically controlled spatial/temporal light flux modulation, registration of ionizing radiation fields such as ultraviolet and X-ray radiations, and the nuclear particle flux.

BACKGROUND OF THE INVENTION

Sodalites fall into the category of cage type aluminosilicates in which aluminum and silicon ions are tetrahedrally surrounded by oxygen ions to form a three-dimensional aluminosilicate cage structure with cubic octahedral cavities. Part of these cavities, or all of them, are filled with halogen ions tetrahedrally surrounded by alkali metal ions. The degree of filling the sodalite cage cavities is indicative of the amount of nonstoichiometry of the sodalite structure which is the main governing factor controlling the photochromic and cathodochromic properties of sodalites. In this case, the 100%-filling of the sodalite cage cavities with alkali-halide tetrahedra is equivalent to stoichiometric form, and correspondingly, to zero amount of nonsoichiometry. The crystal lattice of the sodalite cage structure has cubic symmetry, and hence the sodalite crystals are optically isotropic.

The crystalline structure of sodalite in the form of mineral chlorosodalite was first thoroughly investigated and described by L. Pauling in 1930 (L. Pauling, "The structure of Sodalite and Helvite", Zeitschrift für Kristallografie, v.74, 1930, p.213). In the natural chlorosodalite studied by L. Pauling, which has an idealized chemical formula $Na_6Al_6Si_6O_{24}.2(NaCl)$, between 85 and 90% of cavities of the aluminosilicate cage are filled with $ClNa_4$-tetrahedra. The lattice constant of the aluminosilicate cage of this sodalite is 8.87 Å, and, correspondingly, the volume of each cubic octahedral cavity is about 150 Å$^3$.

On discovering photochromic, and subsequently, cathodochromic properties in natural chlorosodalites, some attempts were made to use these materials for manufacturing the screens of cathodochromic CR storage tubes known as the sciatrons. The industrial application of natural sodalites in optoelectronics, however, was limited by the shortage of raw materials, high cost of extraction and processing, high proportion of impurities, low nonstoichiometry value of the composition, and other causes. Consequently, the development of synthetic sodalite materials was initiated resulting in a wide range of sodalites of different chemical compositions.

The known synthetic sodalite materials widely vary in their chemical composition. So, for example, sodalite materials have been synthesized in which part of the $Al^{3+}$ and $Si^{4+}$ ions of the aluminosilicate cage is replaced by $Ga^{3+}$ and $Ge^{4+}$ ions, respectively. Known are synthetic sodalite materials which, unlike the previously described chlorosodalite, contain ions of halogens other than chlorine ($Cl^-$), namely: fluorine $F^-$, bromine $Br^-$, and iodine $I^-$, separately or in combination, and part of the sodium ions ($Na^+$) is replaced by ions of other alkali or alkaline-earth metals. Some synthetic sodalite materials may contain alloying additions such as $SO_4^{2-}$, $S^{2-}$, $Se^{2-}$, $Te^{2-}$, $WO_4^{2-}$, etc. The desired photochromic and cathodochromic properties of sodalite materials are provided by varying the chemical composition. Here the crystalline structure of sodalites remains unaltered, but the lattice constant of the aluminosilicate cage is liable to change, generally increasing compared to that indicated above for mineral chlorosodalite, which leads to a shift in the colour center absorption band, resulting in turn, in changed photochromic and cathodochromic characteristics.

These changes in chemical composition are generally realized in sodalite powders, which is the most commonly used form of photochromic or cathodochromic sodalite materials. Such synthetic sodalite powders are mostly prepared by the solid-phase sintering method, the low-temperature hydrothermal method, or the zeolite conversion method (B. W. Faughnan, J. Gorog, P. M. Heyman, J. Shidlovsky, "Cathodochromic Materials and Applications", Proceeding of the IEEE, v.61, No.7, 1973, pp.927-941). In implementing these methods, the starting materials are elements or element compounds providing the desired chemical composition of sodalites. In order to increase the photochromic and cathodochromic sensitivity of synthetic sodalite powders, they are sensitized by heat treatment at a temperature of from 600° to 1000° C. for a period ranging from tens of minutes to a few hours (U.S. Pat. No. 3,799,881, published in 1976). Such treatment removes a certain part of alkali halides from the aluminosilicate cage structure cavities, making it possible to reach the desired amount of nonstoichiometry of the sodalite composition, lying within the range 5–70%.

As the synthetic sodalite powders are employed for manufacture of sensing elements of variable light transmission devices, a sensitive layer is formed by deposition, evaporation, or sintering of the sodalite powder on a rigid substrate. The synthetic sodalite powders enable us to produce sensing elements exhibiting good photochromic or cathodochromic properties. The powder form of the materials considered, however, gives rise to heavy diffuse light scattering in sensitive layers of such materials, and consequently, to a low optical transparency. It presents difficulties in the readout of the stored information by projecting it onto the screen, since the use of a simple projection system with the light flux passing through the sensing element results in a low-resolution and low-contrast image. In order to minimize the effect of diffuse light scattering, a variable light transmission device was proposed permitting the information readout from the same surface of the sensitive layer that was used for the information storage, while the projection of the image is carried out in the reflected light flux (L. T. Todd, C. J. Starkey, "High brightness, high resolution projection CCRT", 1977, International Electron Devices Meeting, IEEE, New York, 1977, pp.80A-D). Such a device is largely complicated, and also it fails to eliminate the effect of the diffuse light scattering, due to the sensitive layer surface, on the quality of the image projected.

The presence of the diffuse light scattering in the sensitive layer of sodalite powder prevents the use of the coherent light for reading and writing the information, thus substantially limiting the areas of applications of the sensing elements based on sodalite powder. Further, the inherently large surface area of powder materials brings about an increased adsorptive capacity with respect to water molecules and hydroxyl groups. The large number of vacancies in the aluminosilicate cage structure of sodalites also contributes to this effect. Therefore, considerable amounts of water, in the form of molecules or hydroxyl groups, are accumulated with time in the sensitive layers of sodalite powders, even in those subjected to dehydration, resulting in a reduced sensitivity of the sodalite as a registration medium. Furthermore, the manufacture of sensing elements using sodalite powders is rather complicated, since measures to avoid penetration of impurities should be taken, as the sensitive layer is formed. The need in a rigid substrate when using the sodalite powders gives rise to certain problems in the choice of materials capable of resisting high-energy radiation, while providing a strong mechanical coupling with the sensitive layer formed on the substrate.

In order that light transmission of the sensitive layer of synthetic sodalite powders be improved, it was proposed to add 50–70 weight percent of aluminum phosphate (USSR Inventor's Certificate No. 674116, published in 1979). In this manner, an immersion medium was expected to be produced in the sensitive layer, having sodalite crystals distributed therein and exhibiting a refractive index close to that of the sodalite. However, the decrease in diffuse light scattering proved to be very small, while radiation resistance of such a sensitive layer compared to sensitive layers consisting of sodalite alone was severely impaired due to mechanical electron-beam induced microdefects. In addition, there was a noticeable increase in electron beam energy absorption together with a number of other unwanted effects.

In addition to synthetic sodalite powders, there are photochromic and cathodochromic sodalite materials in the form of single crystals grown by the high-temperature hydrothermal method followed by radiation sensitization (cf. USSR Inventor's Certificate No. 400137 published in 1974). The chemical composition of such sodalites may be expressed by the formula of hydrosodalite $Na_6Al_6Si_6O_{24}.2 (NaOH).3H_2O$. In this case, as much as 20–30% of hydroxyl groups can be replaced by halogen ions or other alloying additions. Single crystals of sodalite possess a high optical transparency, but a sufficiently high amount of nonstoichiometry and consequently, satisfactory photochromic and cathodochromic properties have not been achieved so far. Besides, the known method of sodalite single crystal growth fails to provide sodalites of an optimum chemical composition comparable to that encountered in synthetic sodalite powders exhibiting the maximum photochromic and cathodochromic sensitivity. At the same time, the process of synthesizing monocrystaline sodalite is very cumbersome, expensive, and time-consuming, and the single crystals are produced in sizes not exceeding a few centimeters and cannot be employed as sensing elements for variable light transmission devices, considering their nonuniformity.

U.S. Pat. No. 3,923,529 published in 1975 deals with sodalite-like photochromic materials in the form of glasses or glassceramic. In accordance with this patent, the glasses are prepared by processing the mixture providing a chemical composition of the glasses close to that of the sodalites. Glass materials, however, basically differ from sodalites in that they have an amorphous structure. Glassceramic, according to the patent, was fabricated from glass by means of heat treatment to provide inner crystallization in glass to form sodalite crystals and similar crystalline phases. Such glassceramic in the monolithic form including sodalite crystal particles can be thought of as the nearest counterpart of the present invention.

Like sodalite single crystals, the sodalite-like glasses are optically transparent and not water-adsorbing. In this case, sufficiently large glass sizes may be available as compared to those produced by synthesis of single crystals of sodalite. As apparent from the data, the photochromic sensitivity of sodalite-like glasses produced, however, is as low as that of the sodalite single crystals, and the evidence of their cathodochromic sensitivity is not available as yet. In fact, it is basically impossible to achieve satisfactory photochromic or cathodochromic properties in sodalite-like glasses. It is due to inherently amorphous structure of the glasses, being deprived of a crystalline cage with isolated cavities that are indispensable for generation of F colour centres. Glassceramic comprising sodalite crystals distributed in the amorphous phase, as evidenced by the data, shows a higher photochromatic sensitivity. Yet glassceramic is not optically transparent. Furthermore, the method of its preparation comprising the known glass manufacturing process characterized by high temperature parameters makes it impossible to obtain a sufficiently high content of high-volatile halogens in glass and hence, in glassceramic fabricated therefrom. It prevents satisfactory photochromic or cathodochromic properties from being attained in sodalite glassceramic.

As may be inferred from the above description of the prior art, of all the known sodalite materials, only synthetic sodalite powders can be employed for preparation of the sensing elements of variable light transmission devices, these powders being used to form a sensitive layer on a rigid substrate. Such sensitive layers, however, fail to provide satisfactory optical performance, as was mentioned above.

SUMMARY OF THE INVENTION

It is the object of the present invention to provide a photochromic and/or cathodochromic sodalite material such that its structure should permit high photochromic and cathodochromic performance, while maintaining good optical transparency of the sensing elements of variable light transmission devices manufactured using this material.

This object is attained in a photochromic and/or cathodochromic sodalite material representing a monolith comprising sodalite crystals, which according to the present invention, has a homogeneous polycrystalline structure, its density amounting to 99% or more of the theoretical density of sodalite with an identical chemical composition.

The method of preparation of the photochromic and/or cathodochromic material, according to the basic solution, comprises the moulding of a halogen-containing sodalite powder at a temperature below those allowing intense evaporation of alkali halides and incongruent melting of the sodalite powder, but on the other hand, as high as possible to allow intense recrystallization of the powder, the hot moulding process being carried out until a density of the mass is reached which is at least 99% of the theoretical density of the sodalite identical, in chemical composition, to the material being prepared.

The sensing element of a variable light transmission device made from the basic material represents a plate of a thickness adjusted according to the desired sensitivity of radiation registration and the contrast ratio of the image stored, when operating in transparent mode.

The sodalite material for photochromic and/or cathodochromic applications, in accordance with the present invention, has an insignificant diffuse light scattering, by virtue of its extremely high density as mentioned above. Therefore, considering optical isotropy of the sodalite crystals, this material exhibits optical transparency. In addition to this, since the crystalline structure of sodalites is fully reproduced in the material of the invention, it can provide good photochromic and cathodochromic properties. The method of the invention allows one to use any sodalite powders for preparation of the material, the chemical composition and the crystalline structure of the starting sodalite powder being preserved in the final product. As a result, photochromic and/or cathodochromic sodalite materials may be prepared that exhibit characteristics comparable to those of the synthetic sodalite powders. It will be noted that in the material of the present invention, it is only the very thin surface layer that adsorbs water, so that it does not essentially affect its characteristics, which would be the case for single crystals of sodalite as well as for sodalite-like glasses and glassceramic.

When implementing the method of the present invention, it is preferable that the moulding parameters be set in the following optimum ranges: temperature 950°–1250° C., pressure 50–300 MPa, moulding time 20–40 min.

To remove undesirable high-volatile impurities and water from the cavities of the sodalite cage it is advisable to perform, prior to moulding, vacuum heat treatment at a temperature ranging from 400° to 700° C. for a period of 30–60 min.

The nature of the present invention, its performance and economic factors are further clarified by detailed description if its embodiments taken in conjunction with the accompanying drawings.

DESCRIPTION OF THE PREFERRED EMBODIMENTS

Figure 1:
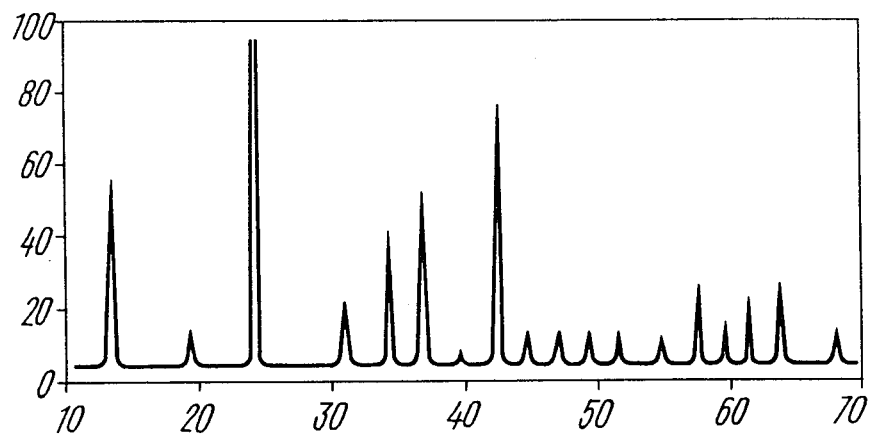
FIG. 1 shows an X-ray photograph of chlorosodalite prepared in accordance with the nature of the present invention.

In accordance with the present invention, the sodalite material exhibiting photochromic and cathodochromic properties represents a monolithic polycrystalline sodalite with a density of 99% or more of the theoretical density of a single crystal of the same chemical composition as the material prepared according to the invention. In this case, such material may be of any chemical composition, if only it corresponds to the chemical formula of sodalites expressed in the most generalized form as $Na_6Al_6Si_6O_{24} \cdot 2(1-n)NaX$, "X" is any halogen or a combination thereof, and "n" is the amount of nonstoichiometry lying within the range $0.05 \leq n \leq 0.7$. In specific examples of sodalites, part of the elements Na, Al, Si, and X in the formula indicated may be replaced by other dopants, or else they may be inserted additionally. Such modifications using widely known dopants are largely considered hereinbelow.

The method of preparation of the monolithic polycrystalline sodalite according to the invention, includes the moulding of the starting sodalite powder to obtain a monolite with a density at least 99% of the theoretical density of the sodalite having the same chemical composition as the polycrystalline sodalite prepared.

The moulding conditions are adjusted so as to provide intense recrystallization of sodalite powders, but at the same time, the temperature (with due allowance made for the pressures applied) is set below those levels which encourage intense volatilization of alkali halides and incongruent melting of sodalite, i.e. cause destruction of the crystalline cage structure of the sodalite. Intense volatalization of alkali halides contributes to incongruent melting of sodalite. Therefore the temperatures at which these phenomena occur are sufficiently close to each other. The initial temperatures of intense volatalization of alkali halides are dependent on their chemical composition and range from 1100° to 1400° C. as established for sodalite powders (P.J.R.S. B. Bhalla, "Electron-beam damage in Cathodochromic Sodalites". J. of Applied Physics, v.45, No.9, 1974, pp.3703–3709). The sodalite structure is preserved provided the above condition is met. With due cosideration to fulfilment of this condition, however, the temperature must be sufficiently high to allow an intense recrystallization process in the mass of sodalite powder (F. K. Volynets, "Present and Future Development of Optoceramics", Optomechanical Industries, No.11, pp.39–41, 1978). As experimentally shown, intense recrystallization in sodalites occurs at temperatures above 800° C.

When a higher amount of nonstoichiometry is to be provided in the material to be prepared as compared to the starting sodalite powder, it is preferred that the moulding temperature be maintained at as high a level as possible, and the moulding time extended. It enables part of alkali halides to be volatilized, thus increasing the amount of nonstoichiometry. The optimum hot moulding regimes may be selected with the following parameter ranges: temperature 950°–1250° C., pressure 50–300 MPa, moulding time 20–40 min.

In some cases, prior to moulding, it is advisable that the starting powder material be subjected to vacuum heat treatment at a temperature of 400°–700° C., during 30 to 60 min. This treatment may be carried out in the same furnace that is used for hot moulding. Such treatment makes it possible to remove high-volatile impurities adsorbed by the sodalite powder and the water contained in the sodalite powder in the form of water molecules and hydroxyl groups.

After the hot moulding operation has been completed, the resultant solid-state polycrystalline sodalite is cooled.

Such cooling is performed directly in the furnace where the moulding was carried out.

All this is further illustrated in detail by the following examples.

EXAMPLE 1

This example relates to a material prepared in accordance with the present invention and belonging to chlorosodalites with a chemical composition expressed by a formula $Na_6Al_6Si_6O_{24}(NaCl)_{1.6}$.

For preparation of the material, a synthetic sodalite powder with a chemical composition of the formula $Na_6Al_6Si_6O_{24}(NaCl)_{1.8}$ was used, its grain sizes ranging from 0.5 to 2 microns. A press mould was filled with this powder and placed in a vacuum furnace for hot moulding. The furnace was then evacuated down to a residual pressure of 0.0133 Pa and the powder was heated to a temperature of 1100° C., with continuous evacuation maintained both during the process and thereafter. The powder was kept at the temperature for a period of 15 min. A pressure of 147 MPa was then applied to the powder and maintained at this level for 20 min. The pressure was then removed and the furnace cooled.

The resulting material was transparent monolith by appearance. Plates were cut from this monolith to investigate the properties of the material obtained.

The structure of the material prepared was investigated by X-ray structure analysis of one of the plates. Its X-ray photograph is shown in FIG. 1. As will be apparent from the X-ray photograph, the material prepared retains the structure of sodalites whose X-ray photographs are given elsewhere (cf. ASTM "Diffractional data cards and alpha-betial and grouped numerical index of X-ray diffraction data". Philadelphia, published by Americal Society for Testing of Materials, pp.1946–1977).

The density of the material prepared was measured by hydrostatic weighing in toluene. This density was found to be 99.98% of the theoretical density of chlorosodalite with the chemical composition of the prepared polycrystalline monolithic sodalite.

Figure 2:
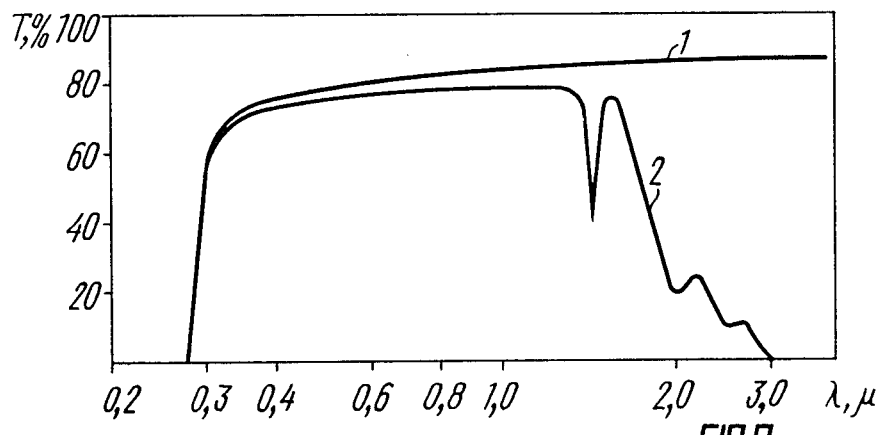
FIG. 2 represents light transmission spectra of chlorosodalite prepared in accordance with the nature of the present invention (curve 1) and of a single crystal of hydrosodalite (curve 2)

Optical properties of the material prepared were also studied. To this end, a 0.4 mm thick plate was taken. The transmission spectrum, at wavelengths that range from 0.25 to 3.0 microns, measured on this plate is shown in FIG. 2—curve 1. In FIG. 2, the abscissa is the wavelength $\lambda$ in microns, and the ordinate is the transmission coefficient T in percent. For comparison purposes, plotted in the same figure is the transmission spectrum of a single crystal of hydrosodalite grown by the hydrothermal method and measured on a sample 1.5 mm thick. This spectrum is taken from the work of Yu. V. Shaldin et al.("Electrical and optical properties of Sodalite single crystals". Crystallografia, v.10, issue 4, 1965, pp.574–577). As seen from FIG. 2, for wavelengths in the range from 0.28 to 1.3 microns, the light transmissions of the material prepared and of the hydrosodalite single crystal are closed to one another and amount to 85%. On the other hand for the wavelengths 1.3–3.0 microns, the transparency of the material prepared is much in excess of the light transmission of the single crystal of hydrosodalite. An appreciable degradation in light transmission of the single crystal of hydrosodalite in this spectral region is known to be due to light absorption in water contained in the hydrosodalite crystal. The fact that light is not absorbed, in this spectral region, in the material prepared indicates dehydration of the material. Also it will be noted that the transmission spectrum obtained for the material prepared was measured on a plate fabricated six months before its investigation. Taken together, all these factors support, that the material of the present invention retains its dehydrated state for a very long time.

Figure 3A:
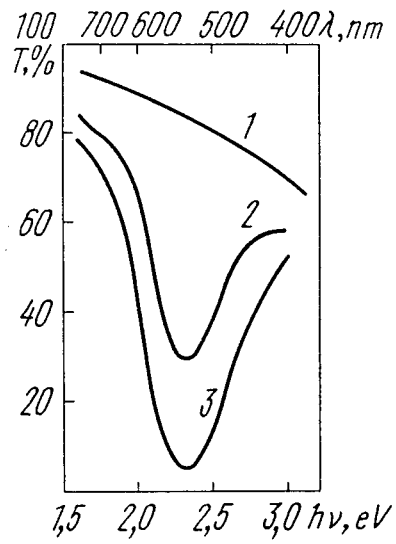
FIGS. 3 a,b are light transmission spectra of chlorosodalite prepared in accordance with the nature of the present invention, before (curve 1) and after (curves 2, 3) irradiating with an electron beam and X-radiation (curves 2 and 3 of FIG. 3a, respectively, with vacuum ultraviolet and alpha radiation (curves 2 and 3 of FIG. 3b, respectively)
Figure 3B:
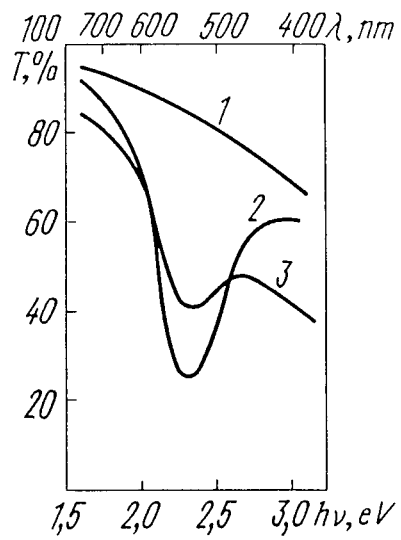

To estimate photochromic and cathodochromic characteristics of the material prepared, the plates fabricated therefrom were exposed to different forms of radiation and the absorption spectra were measured before and after irradiation. The transmission spectra before and after irradiation, for a plate 0.075 mm thick are represented in FIGS. 3 a, b. In these figures, on the abscissa the light wavelengths $\lambda$ in nm (Upper scale) and the light quantum energies $h\lambda$ in eV (Lower scale) are plotted, and the ordinate is the transmission coefficient T in %. Curves 1 show the transmission spectrum of the plate before irradiation. The transmission spectrum of the plate after irradiating it with an electron beam for 10 min is shown as curve 2 in FIG. 3a, the accelerating voltage of the beam being 20 kV and the current density 1 $\mu A/cm^2$. Curve 3 in this figure shows the transmission spectrum of the plate after irradiating it, for 300 minutes, with X-ray radiation, using an X-ray tube with a copper anticathode operating at a voltage of 50 kV and at currents of 15 mA. The transmission spectrum of the plate after its exposure, for 100 min, to vacuum ultraviolet radiation of a wavelength 147 nm, using a xenon resonance lamp, is shown as curve 2 in FIG. 3b. Curve 3 in the same figure represents the transmission spectrum of the plate after its exposure, for 10 hours, to an alpha-particle stream from 237 Pu isotope with activity of $10^6$ decays per second. As seen from these figures, the material prepared is coloured by all the radiation forms mentiomed. It will be further shown, that for such a material, the absorption band maximum lies at about 535 nm, which is near the absorption band maxima of F colour centres for chlorosodalite powders, as previously mentioned elsewhere. The figures in question (FIGS. 3a and 3b) also show that the contrast ratio of the stored image for the material prepared is sufficiently high with different forms of radiation.

Figure 4:
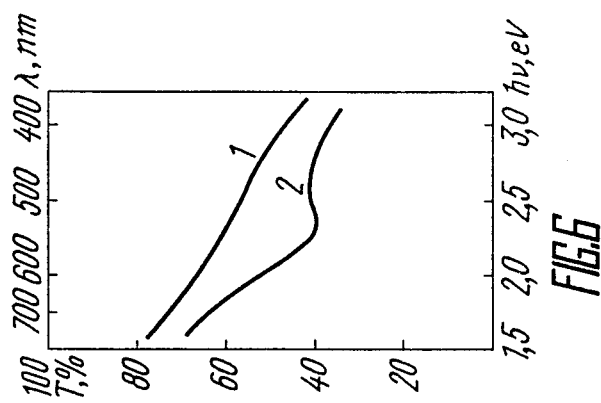
FIG. 4 shows light transmission spectra of chlorosodalite prepared in accordance with the nature of the present invention, before (curve 1) and after (curve 2) irradiating of a 0.5 mm thick sample with X-ray radiation, for different irradiation doses.

FIG. 4 demonstrates another advantageous feature of the prepared material. This figure shows the transmission spectra of a plate 0.5 mm thick before (curve 1) and after exposure at X-ray radiation for different periods of irradiation: 5 min. (curve 2), 20 min. (curve 3), and 120 min. (curve 4). The operating conditions of the X-ray tube were identical to those in the previously described experiments. As shown in FIG. 4, the high optical performace of the prepared material enables thick plates operating in transparent mode to be employed in registrating high-energy radiation. As is apparent from FIG. 4, the stored picture contrast is changed as the irradiation dose varies, and the contrast ratio may exceed the values of 100:1 (curves 3 and 4).

EXAMPLE 2

This example deals with a material prepared in accordance with the present invention, in which, the chlorine halogen of Example 1 is replaced by the bromine halogen and the chemical formula becomes: $Na_6Al_6Si_6O_{24}(NaBr)_{1.7}$. Such a material possesses chathodochromic properties.

A synthetic sodalite powder with grain sizes 3-5 microns and the chemical composition expressed by the formula $Na_6Al_6Si_6O_{24}(NaBr)_{1.8}$ was used to prepare this material. This powder was charged into the press mould and placed in a vacuum furnace for hot moulding. The furnace was then evacuated to obtain a residual pressure of 0.133 Pa. This was followed by heating the powder to 400° C. and maintaining it at this temperature for 1 hour with continuous evacuation, removing water and high-volatile impurities adsorbed by the powder.

On completing the step of thermal evacuation, the furnace was heated to the temperature 1200° C. and the sodalite powder was moulded at a pressure of 50 MPa during 40 minutes. A higher moulding temperature setting in this example, as compared to Example 1, is made possible by bromosodalites having higher temperatures that cause intense volatilization of the alkali halide and incongruent melting. After the moulding process had been completed, the pressure was removed and the furnace cooled.

The prepared material appeared in the form of a transparent monolith. Plates were cut out of this monolith to investigate the characteristics of the prepared material. Similarly to Example 1, the X-ray structure analysis showed that the prepared material retained the sodalite structure. The density of the prepared material amounted to 99.9% of the theoretical density of bromosodalite with the identical chemical composition. The transmission spectra of the material under investigation proved to be similar to the transmission spectrum of FIG. 2 for the material of Example 1.

Figure 5:
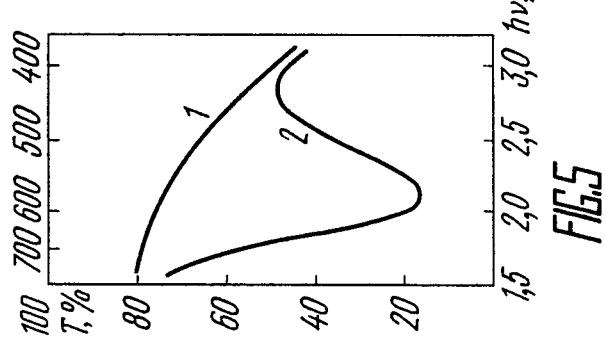
FIG. 5 shows light transmission spectra of bromosodalite prepared in accordance with the nature of the present invention, before (curve 1) and after (curve 2) irradiating with X-ray radiation.

The comparison of the transmission spectra of the prepared material before and after irradiation was conducted on a plate 0.1 mm thick. The plate was exposed to X-ray radiation for 10 minutes under conditions indicated in Example 1. The measured transmission spectra plotted in FIG. 5 show a good sensitivity of the bromosodalite obtained to X-ray colouring. When comparing FIG. 3 and FIG. 5, it will be seen that the maximum of the absorption band of F colour centres is shifted towards the long-wave spectral region with respect to this maximum for the material of Example 1, which is also the case for the sodalite powders when the chlorine ions are replaced by the bromine ions.

EXAMPLE 3

This example concerns a photochromic material prepared in accordance with the present invention in which, as distinct from Example 1, sulphur S is added as a dopant according to the following chemical formula: $Na_6Al_6Si_6O_{24}(NaCl)_{1.8}$—S (0.1 weight percent).

This material was prepared using synthetic sodalite powder with grain sizes of 1-5 microns and with a chemical composition expressed by the formula $Na_6Al_6Si_6O_{24}(NaCl)_{1.8}$—S (0.5 weight percent). This starting powder was of poor quality, having a non-uniform phase composition.

The same sequence of operations was used in preparation of this powder as in Example 1. The parameters of the process, however, were different. The furnace was evacuated to the residual pressure of 1.33 Pa. The moulding was preformed at a temperature of 950° C. and a pressure of 245 MPa during 45 minutes. This lower temperature setting, compared to Example 1, was selected to minimize sulphur evaporation. But this could be achieved at the expense of a longer moulding time to provide the required compression.

The material prepared was similar in appearance to the materials in the above examples, and its X-ray photograph was essentially identical to that of the material according to Example 1 with the exception of some departure due to the presence of the second phase. The density of the prepared material amounted to 99.1% of the theoretical density of chlorosodalite.

Figure 6:
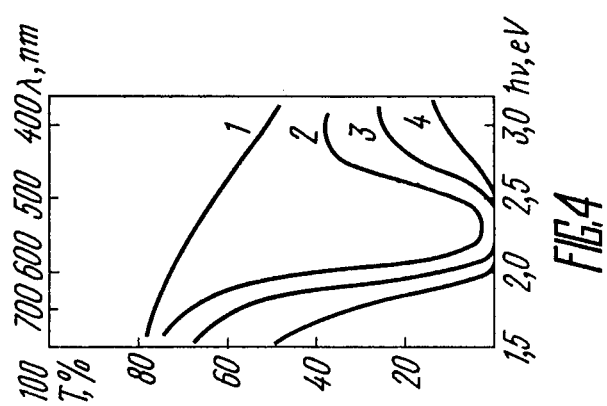
FIG. 6 shows light transmission spectra of sulphur-doped chlorosodalite prepared in accordance with the nature of the present invention, before (curve 1) and after (curve 2) irradiating with ultraviolet light.

The comparison between the light transmission spectra of the prepared material before and after irradiation was made on a plate 0.2 mm thick. In this case the plate was exposed to ultraviolet radiation of a 120 W-mercury-discharge lamp for 50 minutes. The light transmission spectra obtained are shown in FIG. 6. It is seen from the light transmission spectrum of the prepared material before exposure (curve 1), that the transparency of this material is inferior to that of the materials according to Examples 1 and 2, which arises from the poor quality of the starting sodalite powder. But the light transmission of this material is also sufficiently high, as shown by FIG. 6., from which is also apparent that the prepared material is capable of being coloured by ultraviolet light.

EXAMPLE 4

Like Example 3, this example relates to a photochromic material prepared in accordance with the present invention in which, in contrast to Example 3, iron Fe was added as a dopant, in conformance with the following chemical formula: $Na_6Al_6Si_6O_{24}(NaCl)_{1.7}$—Fe (0.1 weight %).

A synthetic sodalite powder with grain sizes 1-2 microns and with the chemical composition $Na_6Al_6Si_6O_{24}(NaCl)_{1.85}$—Fe (0.1 weight %) was employed for preparation of this material. The material was here prepared in the same sequence as in Example 2, with a preliminary vacuum heat treatment. The process parameters were, however, different. The furnace was evacuated to obtain the residual pressure 13.3 Pa. The vacuum heat treatment was carried out at a temperature of 700° C. during 30 minutes. The moulding temperature was 1100° C., under pressure 200 MPa applied for 30 min.

The appearance of this prepared material was similar to that of the other aforementioned materials, and its X-ray photograph was identical to the X-ray photograph of the material according to Example 1. The density of the prepared material is 99.99% of the theoretical density of chlorosodalite.

Figure 7:
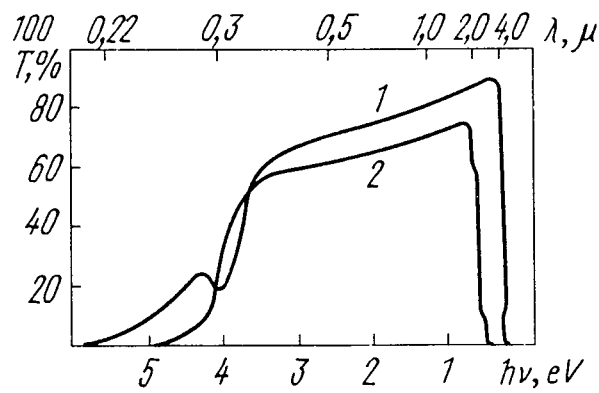
FIG. 7 shows light transmission spectra of iron-doped chlorosodalite prepared in accordance with the present invention (curve 1) and of a single crystal of hydrosodalite (curve 2)

A light transmission spectrum was measured on a plate 0.35 mm thick made of this prepared material in a wavelength region 0.2–5 microns, i.e. in a wider spectral range than in Example 1. Another available specimen 1 mm thick of a monocrystalline hydrosodalite was also tested in the same spectral range, for comparison purposes. The mesured transmission spectra are represented in FIG. 7. These spectra are, in general, similar to those shown in FIG. 2. As is apparent from FIG. 7, however, the long-wave transparency boundary of the material studied in this particular example (curve 1) occurs at 4.5 microns, whereas for monocrystalline hydrosodalite (curve 2), such boundary occurs at about 2 microns. It shows a considerable expansion of the transparency region provided by the prepared material, against this region for the monocrystalline sodalite. This property is characteristic of all the materials according to the present invention. The light transmission spectrum of the material under investigation in FIG. 7 shows an absorption band at a wavelength of 305 nm, which is due to the iron dopant added to the material prepared in accordance with the present invention.

The comparison of the light transmission spectra of the given material before and after irradiation was made on a plate 0.075 mm thick. The plate was irradiated with ultraviolet light, using a mercury-discharge lamp of a power 120 W, for 20 min. The light transmission spectra obtained before (curve 1) and after (curve 2) irradiation are plotted in FIG. 8. This figure shows that the prepared material exhibits a high sensitivity to ultraviolet light colouration.

EXAMPLE 5

This example relates to a cathodochromic material prepared in accordance with the present invention in which the bromine and fluorine halogens are combined to give the following chemical formula: $Na_6Al_6Si_6O_{24}(NaBr)_{1.4}(NaF)_{0.2}$.

To prepare this material, a synthetic sodalite powder with grain sizes 1–7 microns and a chemical composition of the formula $Na_6Al_6Si_6O_{24}(NaBr)_{1.45}(NaF)_{0.4}$ was used. The method of preparation of the material in this example is identical to that described in Example 1, except that there was no temperature exposure before the pressure was applied, and the moulding was done at a temperature was done at a temperature of 1150° C.

The prepared material was similar in appearance to the aforementioned materials, and its X-ray photograph closely agreed with the X-ray photograph for bromosodalite previously described in literature. The density of the prepared material was 99.95% of the theoretical density of the sodalite identical in chemical composition.

The light transmission spectra of the prepared material before and after irradiation were compared using a plate 0.1 mm thick. The plate was exposed to X-ray radiation under conditions indicated in FIG. 1, for a period of 20 min.

Figures 8, 9:
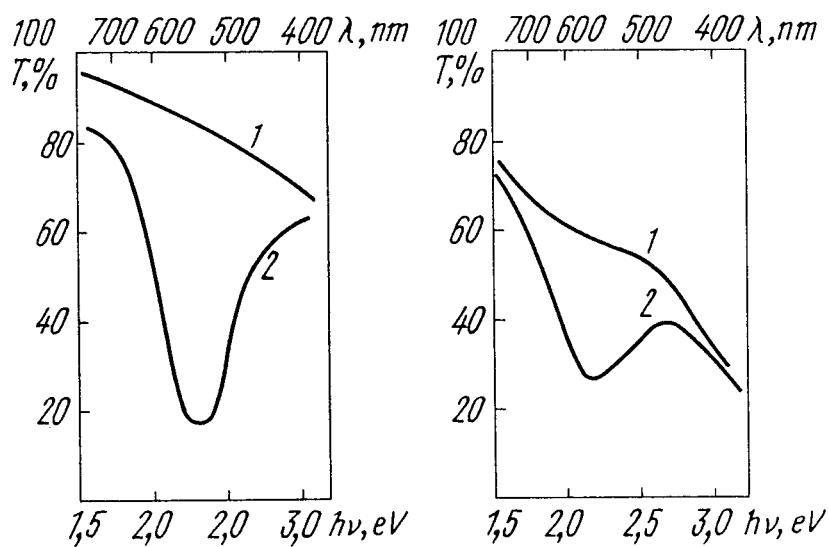
FIG. 8 shows light transmission spectra of iron-doped chlorosodalite prepared in accordance with the present invention, before (curve 1) and after (curve 2) irradiating with ultraviolet light.
FIG. 9 shows light transmission spectra of bromofluorosodalite prepared according to the present invention, before (curve 1) and after (curve 2) irradiating with ultraviolet light.

The light transmission spectra obtained before (curve 1) and after (curve 2) irradiation are shown in FIG. 9. It is apparent from the figure that the material prepared exhibits a good sensitivity to colouring with an ionizing radiation.

Not all the characteristics of the prepared materials have been taken account of in the aforementioned examples, but only those of them that are directly connected with the object of the invention. It is advisable that investigation results for other significant characteristics be summarized, such as reversibility, i.e. possibility to reproduce the write-erase cycle, and the retention time for stored information. As experimentally shown, all the materials discussed in the above examples were discoloured when heated to temperatures of 250°–300° C. The photochromic materials of Examples 3 and 4 were discoloured as a result of illuminating with a white light or the light covering the region of the absorption bands of the F colour centres. These investigations also suggest that an image stored by high-energy radiation is retained for at least six months, while an image stored by ultraviolet light is retained for at least a few days. It is also expedient to note that the investigation results have shown sufficiently good cathodochromic properties in photochromic materials.

The sensing elements of variable light transmission devices are made of polycrystalline monolithic sodalite, according to the invention, by cutting out of the monolith of a plate of required dimensions and subsequent treatment of its surfaces to obtain the desired grade of surface roughness using a method employed in manufacturing optical elements, for example, by successive steps of grinding and polishing.

By virtue of a high transparency of the material prepared in accordance with the present invention, it should be preferably used in transparent mode of operation. In this case, the thickness of the sensing element is to be based on the following assumptions.

In a sensor designed for sensing short-range radiation (electron beam, vacuum ultraviolet radiation, etc.) that is heavily absorbed by sodalite, the thickness is selected as small as possible, but exceeding the penetration depth of the radiation as well as providing the required mechanical strength. On the other hand, if the sensor is intended to sense long-range radiation (X-ray radiation, gamma radiation, ultraviolet light from the range 100–390 nm, etc.), the thickness of the sensing element is taken to be as large as possible based on the required sensitivity and contrast ratio of the image stored by the sensor. It will be noted that there is a direct relationship between the sensitivity to radiation and the contrast ratio of the image stored, on the one hand, and the thickness of the sensing element, on the other hand, as demonstrated by Example 1, until a thickness value is reached such that the radiation sensed will be fully absorbed by the sensing element. A certain increase in light scattering effect, as the thickness is increased, should be accounted for when selecting the proper thickness in this case.

Figure 10:
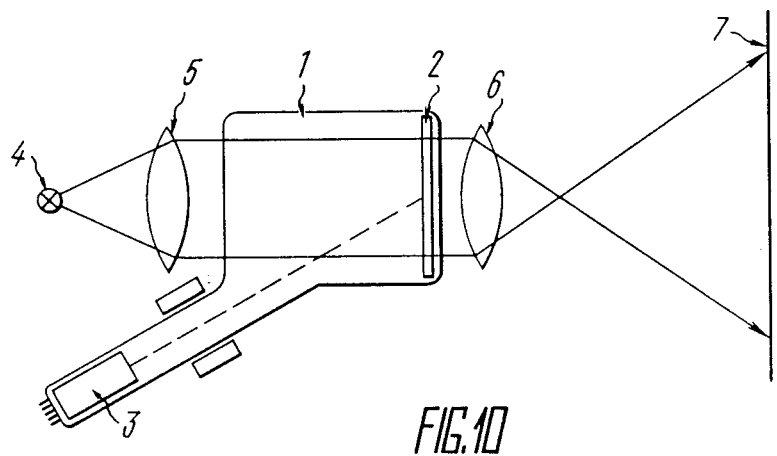
FIG. 10 shows an image projection arrangement using a projection sciatron comprising a sensing element manufactured in accordance with the invention.

FIG. 10 illustrates one of many applications of a sensing element according to the present invention. This drawing shows a projection sciatron 1, its sensing element that represents a target 2 being made of a cathodochromic material of the present invention. An electron gun 3 of the sciatron is directed at an angle to the surface of the target 2. The light beam from a light source 4 falls normally to the target 2 as a parallel beam formed by a condenser 5. An optical system 6 serves for projecting an image onto a screen 7. The information is written by the electron beam of the gun 3. When the information is reproduced in transparent mode, the image is projected onto the screen 7. Owing to high optical performance of the material according to the present invention, a thirty-fold, or greater, magnification of the image is provided, while maintaining a high contrast ratio thereof.

As obvious from the preceding discussion, the prepared monolithic polycrystalline material has important advantages over the known photo and/or cathodochromic materials. The method of its preparation provides transparent sodalite materials of widely varying chemical compositions. This material is not inferior to monocrystalline hydrosodalite in transparency within the near ultraviolet, visible, and near infra-red spectral regions.

The material is in a dehydrated state which is retained for a long time. Therefore, the material is transparent in the infra-red region of the spectrum down to 4.5 microns. The unalloyed material is capable of being coloured by any ionizing radiation, beginning from vacuum ultraviolet light; the doped material is also coloured by the light of the near ultraviolet spectral region.

By virtue of high optical performance of the material, it can be used as a sensing element in the form of thick plates, resulting in an increased registration sensitivity in case high-energy radiation is used. A higher heat conduction of the material compared to the sodalite powder provides a greater ease of thermal erasure. A drastic decrease in the free surface area of the monolithic sodalite material as compared to the powder, ensures a higher radiation resistance.

This method of preparation of the material allows varying oxidation-reduction conditions, causing the dopant ions to be transferred to the desired valent state.

The sensing element of the variable light transmission device made of a material prepared according to the present invention, may have different configurations depending on its application.

INDUSTRIAL APPLICABILITY

The variable light-transmission devices incorporating a sensing element made of the material according to the present invention can be employed for registration and display of information, projection of images, holographic recording, registration of a flux of ionizing radiations such as near ultraviolet light, vacuum ultraviolet, X-ray, and gamma radiation, electron beams, nuclear particles. Such variable light transmission devices are an integral part of facsimile systems, computer input/output control systems, radiation defectoscopy and intrascopy systems, ionizing radiation field visualization systems, radar and projection television systems, and various information systems.

We claim:

1. A method of preparing a photochromic and/or cathodochromic material of the sodalite series comprised of a homogeneous polycrystalline monolith having a density of at least about 99% of the theoretical density of sodalite of the corresponding chemical composition so that the material is optically transparent and having a temperature of incongruent melting, said method comprising the step of:

molding a halogen-containing sodalite powder at a temperature of at least about 800° C. but less than the temperature of incongruent melting and a pressure of from about 50 MPa to about 300 MPa for a time sufficient for the density of the material being molded to reach said density of at least about 99% of the theoretical density of sodalite.

2. A method as disclosed in claim 1, wherein the step of molding is accomplished at a temperature of from at least about 950° C. to at least about 1,250° C. and the molding time is from about 20 to about 40 minutes.

3. A method as disclosed in claim 1, further comprising the additional step of vacuum heat treating the sodalite powder at a temperature of from about 400° C. to about 700° C. for from about 30 to about 60 minutes prior to molding.

4. A sensing element for sensing radiation in a variable light transmission device, said element comprising an optically transparent plate having a thickness which is less than or equal to the depth of penetration of the radiation and being comprised of a photochromic and/or cathodochromic material of the sodalite series, the chemical composition of which is described by the formula $Na_6Al_6Si_6O_{24}\ 2(1-n)NaX$, where X is any halogen or a combination of halogens and n is a nonstoichiometric value lying within the range of $0.05 \leq n \leq 0.70$, said material comprising a homogeneous polycrystalline monolith having a density of about 99% of the theoretical density of sodalite of the corresponding chemical composition so that the material is optically transparent.

5. A photochromic and/or cathodochromic material of the sodalite series, the chemical composition of which is described by the formula $Na_6Al_6Si_6O_{24}\ 2(1-n)NaX$, where X is any halogen or a combination of halogens and n is a nonstoichiometric value lying within the range of $0.05 \leq n \leq 0.70$, said material comprising a homogeneous polycrystalline monolith having a density of at least about 99% of the theoretical density of the sodalite of the corresponding chemical composition so that the material is optically transparent.

* * * * *